United States Patent

Melton

[11] Patent Number: 5,551,790
[45] Date of Patent: Sep. 3, 1996

[54] THERMAL LOAD RELIEF RING FOR ENGINE CASE

[75] Inventor: Patrick B. Melton, Palm Beach Gardens, Fla.

[73] Assignee: United Technologies Corporation, Hartford, Conn.

[21] Appl. No.: 570,428

[22] Filed: Dec. 11, 1995

Related U.S. Application Data

[62] Division of Ser. No. 242,574, May 13, 1994, Pat. No. 5,503,490.

[51] Int. Cl.⁶ ............................................. F16C 17/22
[52] U.S. Cl. .................. 403/28; 403/30; 403/335; 415/214.1; 415/200
[58] Field of Search ..................... 403/28–30, 335, 403/336–338, 24, 293, 294, 292, 13, 14, 41, 404, 306, 375, 376, 380; 415/214.1, 200, 134, 139

[56] References Cited

U.S. PATENT DOCUMENTS

| | | |
|---|---|---|
| 3,892,497 | 7/1975 | Gunderlock et al. .................. 415/134 |
| 4,078,812 | 3/1978 | Beckershoff .......................... 403/28 X |
| 4,566,851 | 1/1986 | Comeau et al. ........................ 415/139 |
| 4,632,634 | 12/1986 | Vinciguerra et al. .................... 415/139 |
| 4,687,412 | 8/1987 | Chamberlain .......................... 415/134 |
| 4,701,103 | 10/1987 | Medgvesy ............................ 415/214.1 |
| 4,836,750 | 6/1989 | Modafferi et al. ..................... 403/28 X |
| 4,859,143 | 8/1989 | Larrabee et al. ...................... 403/30 X |
| 5,362,204 | 11/1994 | Matyscak et al. .................... 403/336 X |
| 5,445,469 | 8/1995 | Huck et al. ............................ 403/30 |
| 5,482,433 | 1/1996 | Norris et al. ......................... 415/200 X |

Primary Examiner—Brian K. Green
Assistant Examiner—Harry C. Kim
Attorney, Agent, or Firm—Norman Friedland

[57] ABSTRACT

A thermal load relief ring is disposed between the mating surfaces of adjacent cases of a gas turbine engine and secured thereto by a dowel pin or bolt to assure the concentricity of the cases. The bolt and dowel pin are configured to assure the concentric fit of the components. These configurations allow the cases to be fabricated from different materials to allow a lighter and less expensive case.

3 Claims, 6 Drawing Sheets

THERMAL LOAD RELIEF RING FOR ENGINE CASE

This a division of application Ser. No. 08/242,574 filed on May, 13, 1994, U.S. Pat. No. 5,503,490.

TECHNICAL FIELD

This invention relates to gas turbine engines and particularly to means for maintaining the case of a modular design concentric.

BACKGROUND ART

As one skilled in gas turbine engine technology will appreciate, it is abundantly important to maintain the engine case, particularly to those cases of a module type of engine construction that support the engine's shaft or rotating components, precisely concentric throughout the engine's operation and over extended periods of time. While this invention was conceived for a particular purpose of correcting a problem where the engine case grew out of concentricity on existing engines, it is intended to be incorporated into originally designed engine cases as well.

To more fully appreciate the problem confronting the inventor at the time the invention was conceived, reference will be made to FIG. 1 that exemplifies the prior art engine cases. Typically, the adjacent engine cases are tied together by nut and bolt assemblies (not shown) secured through the cooperating apertures 14 and 16 formed in the mating flanges 10 and 12 of case 18 and 20, respectively. The axial extending lip 22 is snap fitted on the inner diameter 24 of case 20. Under certain circumstances, particularly when both engine cases are made from the same material that exhibit identical coefficients of thermal expansion, the cases grow and shrink uniformly without causing distortions. However, in order to reduce weight of the engine and improve engine operating performances, current engines employ cases made from different materials and hence exhibit different coefficients of thermal expansion. For example, one case may be made from stainless steel and the other case may be made from a magnesium alloy.

In the present design the materials are different and have different coefficients of thermal expansion and have experienced yielding in case 18 causing the fit to loosen by as much as 0.030 inch. This yielding is attributed to several causes, namely, temperature increase, differences in thermal expansion and a relatively low yield strength of case 18. Since case 18 carries the support mechanism for the bearings that support the engine shaft, it is readily understandable how this yielding is unacceptable and has resulted in bearing failure due to the unacceptable misalignment between case 18 and case 20.

Prior to the conception of this invention, certain solutions were unsuccessfully attempted to fix this problem. Amongst those tried were 1) "softening" the case 20 in the area where the two cases are snap fitted; 2) thickening case 18; changing the material of case 18; and 3) machining axial slots in case 18 adjacent the snap fit.

"Softening" of case 20 and thickening case 18 failed to reduce stresses to an acceptable level. Changing the material of case 18 with a higher yield strength resulted in an undesirable weight increase and prohibited the use of existing hardware when considering the redesign of cases for existing engines. The axial slot configuration which was intended to eliminate hoop stress carrying capabilities was unsatisfactory because it was unreliable due to the low strength of case 18 and the fingers formed as a result of the axial slots deformed excessively.

I lave found that I can obviate the problems enumerated in the above paragraphs by providing a thermal load relief ring Judiciously fitted into the case at discrete positions relative to the snap fit areas which not only result in the successful repair of existing and non-conforming parts, the redesign of highly-stressed problem areas, but it also evidenced significant weight reductions on new design of cases for gas turbine engines, other types of engines or rotating machinery where maintaining concentricity is deemed important or critical.

SUMMARY OF THE INVENTION

An object of this invention is to provide an improved snap fit configuration for attached cases of a gas turbine engine.

A feature of this invention is the utilization of a Judiciously located thermal load relief ring discretely attached to one of the cases adjacent the snap fit area.

Another feature of this invention is the improvement in engine case concentricity by the utilization of a thermal load relief ring attached to the engine case with tangs extending axially in circumferentially spaced slots in the case and securing the thermal load relief ring by a pair of cooperating dowel pins. In another embodiment machine type bolts are utilized and in still another embodiment a dowel pin axially extending from the engine case fits into a radial slot formed in the thermal load relief ring.

Another feature of this invention is the utilization of a thermal load relief ring that is characterized as relatively easy to fabricate and assemble, light in weight, and capable of use for retro-fitting existing engines or capable of being incorporated in newly designed engines.

The foregoing and other features of the present invention will become more apparent from the following description and accompanying drawings.

BEST MODE FOR CARRYING OUT THE INVENTION

While the preferred embodiment of this invention discloses a thermal load relief ring that is adapted for use in the adjacent cases of a gas turbine engine, it is to be understood that the invention is not limited to this particular embodiment, as it has utility in other embodiments for other types of engines and for rotating machinery in general. In fact, this invention has utility to maintain concentricity in any type of embodiment where the mating parts are joined by a snap fit and distortion of the snap fit would result in the loss of the concentricity.

Figure 1:
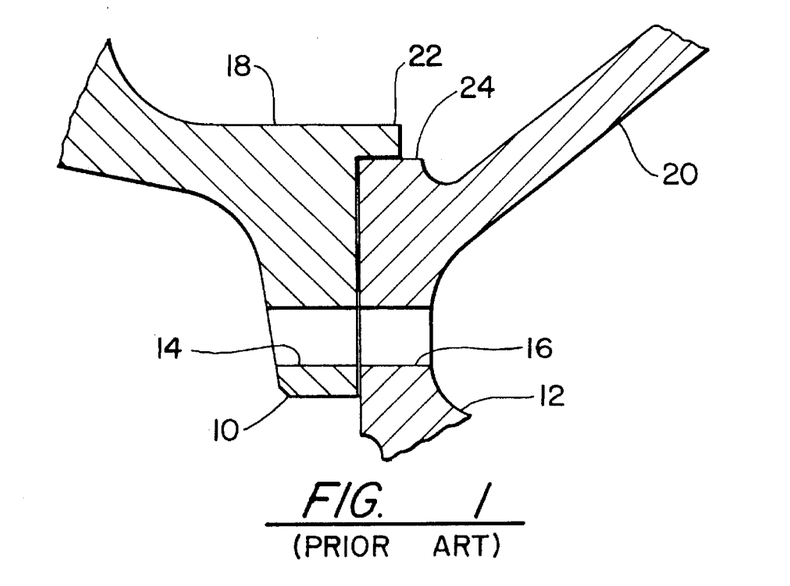
FIG. 1 is partial view in section of the adjacent flanges of adjacent cases of a gas turbine engine illustrating the snap fit of the prior art construction.
Figure 2:
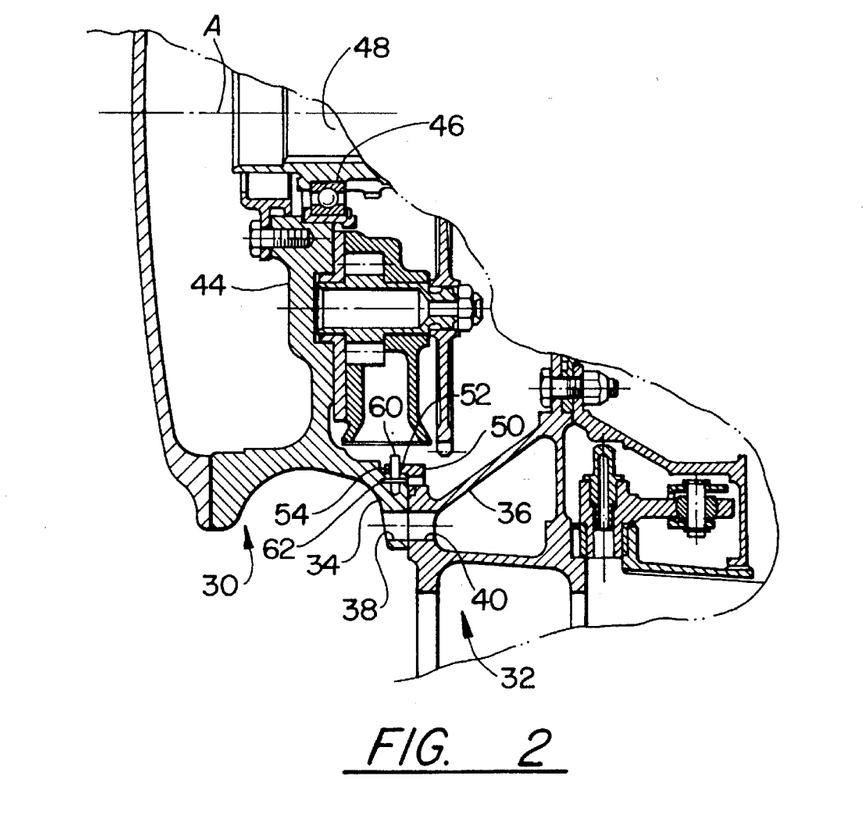
FIG. 2 is a partial view in section of the front support assembly and intermediate case of a gas turbine engine illustrating the details of this invention.
Figure 3:
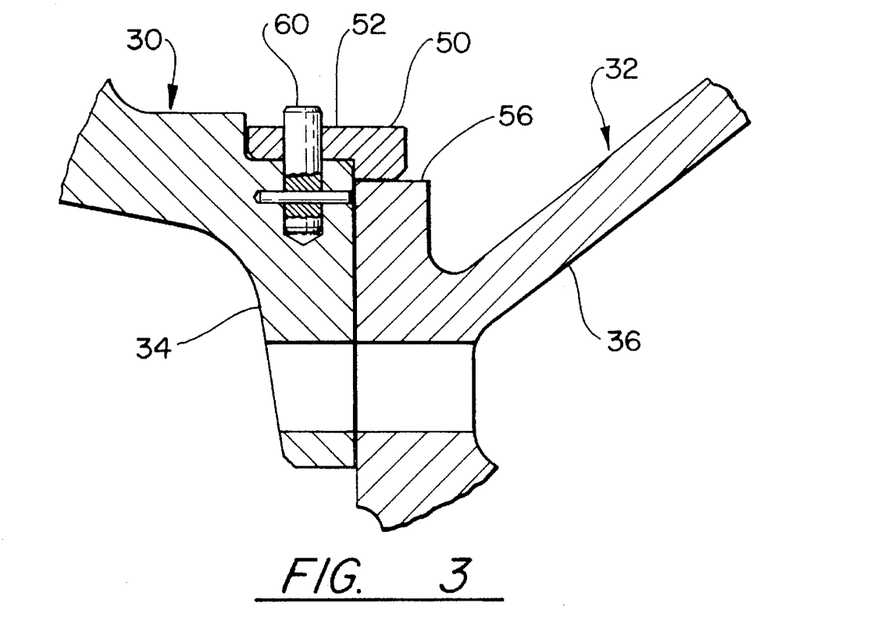
FIG. 3 is an enlarged partial view of the adjacent engine cases of FIG. 2 showing the details of this invention.
Figure 4:
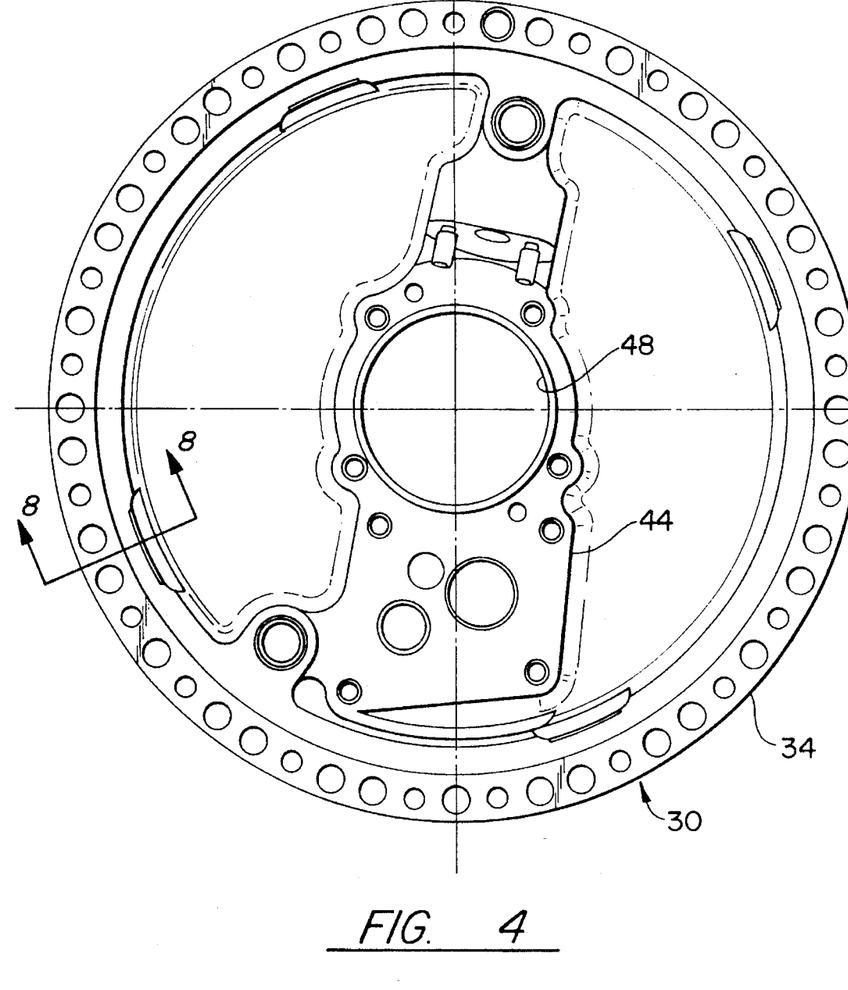
Fig.4 is an end view ill elevation of the front support assembly.

Reference is now made to FIGS. 2–8 which shows the preferred embodiment comprising the front support assembly or case generally indicated by reference numeral 30 and the intermediate case generally indicated by reference numeral 32 Joined together similarly to the prior art of FIG. 1 at the mating flanges 34 and 36 by a plurality of nut and bolt assemblies fitted into circumferentially spaced apertures 38 and 40. As noted the inwardly depending structure 44 serves to support the spherical bearings 46 that, in turn, support the rotating engine shaft 48 mounted about the engine center line A.

According to this invention the thermal load relief ring 50 which is generally square-shaped in cross section (see FIG. 7) and carries a plurality of circumferentially spaced tangs 52 that are fitted into circumferentially spaced slots 54 formed in the inner diameter of the intermediate case 30. The thermal load relief ring 50 is snap fitted on the annular surface 56 of the inner diameter of case 32.

Figure 5:
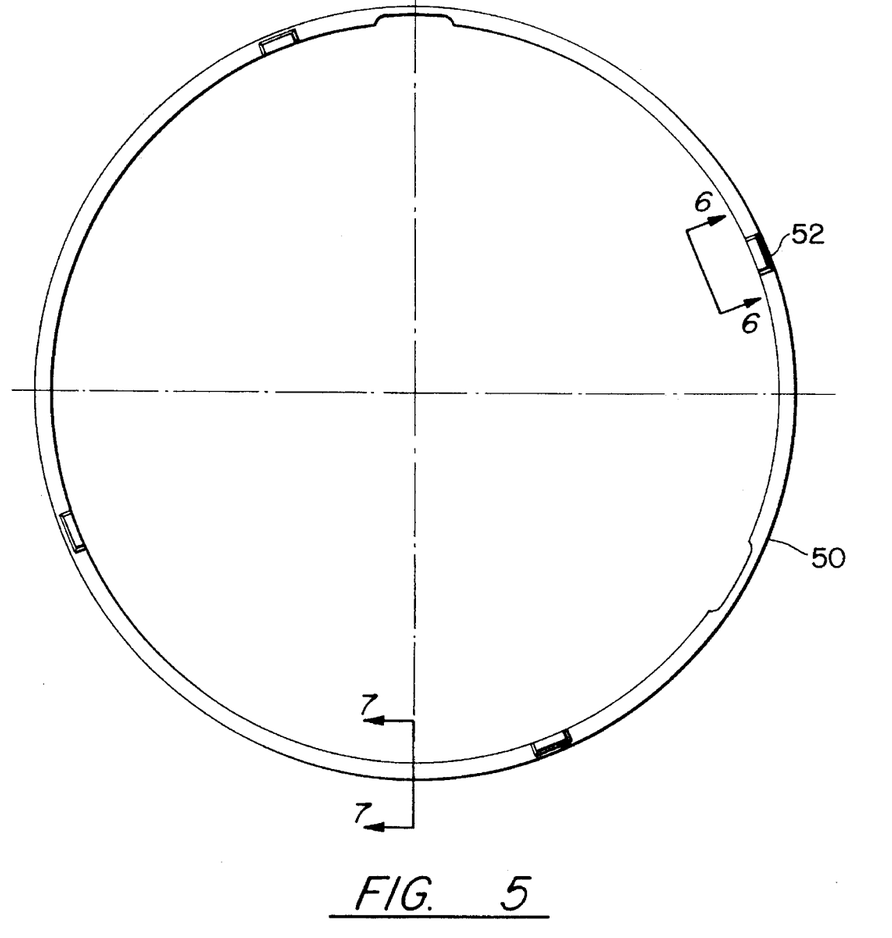
FIG. 5 is a side elevation of the thermal lead relief ring of this invention.
Figure 6:
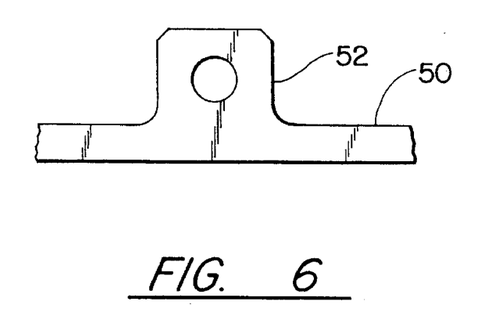
FIG. 6 is a partial view taken along lines 6—6 of FIG. 5.
Figure 7:
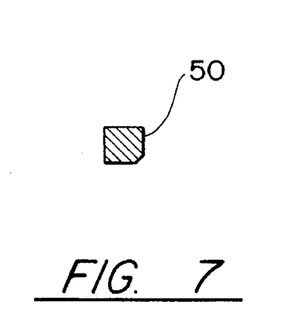
FIG. 7 is a cross sectional view taken along lines 7—7 of FIG. 5.
Figure 8:
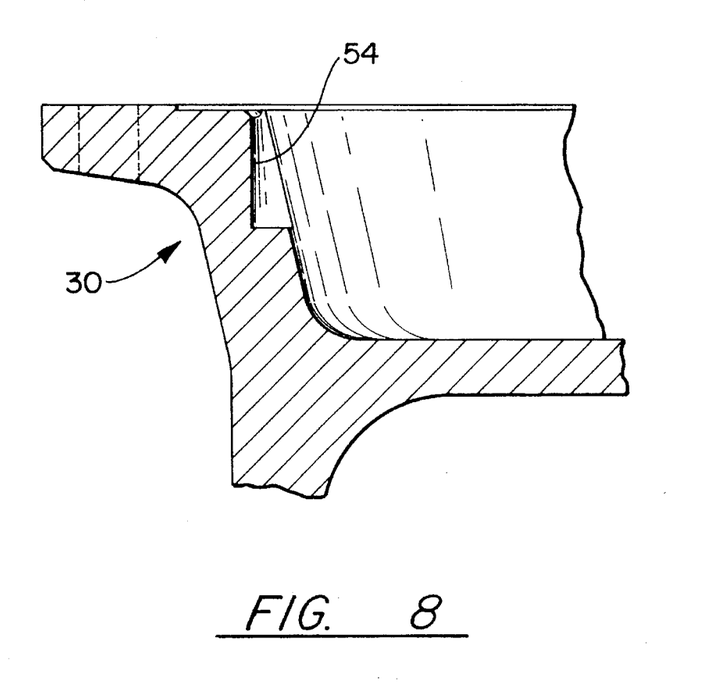
FIG. 8 is a partial view taken along lines 8—8 of FIG. 4.

As will be apparent from the foregoing and an inspection of the FIG. 5.which illustrates a front view of the thermal load relief ring 50, four tangs 52 are equally spaced around the circumference of the ring. While more than four tangs can be employed and the minimum number of tangs could be two, it has been found that at least three tangs should be utilized. In any case., the tangs are spaced around the circumference in order to assure that the thermal load relief ring 50 remains snug through its entire operating envelope and over time.

The coefficient of thermal expansion of the material selected for the thermal load relief ring 50 must be larger or equal to the coefficient of thermal expansion of the intermediate case 32. In assembly, the tangs 52 of thermal load relief ring 50 is fitted into slots 54 and snap fitted onto the intermediate case 32. The thermal load relief ring 50 is pinned into place by the radial dowel pin 60 extending through drilled holes formed in tang 52 and into the inner diameter of case 30 and an axial dowel pin 62 extending through a drilled passage formed in the face of the case 30 and extending through the dowel pin 60.

As will be appreciated, the same fit between the intermediate case 32 and the thermal load relief ring 50 will always remain snug owing to the fact that they are either of the same coefficient thermal expansion or the thermal load relief ring 50 has a greater coefficient of thermal expansion. The relative position between the case 30 and intermediate case 32 will always stay the same ( except for machining tolerance stackup in original assembly) because the radial movement of the thermal load relief ring 50 in the Y-direction is reacted by one of the pinned tangs 52 in the X-direction, and radial movement of thermal load relief ring 50 in the X-direction is reacted by another one of the pinned tangs 52 in the Y-direction. The pinned rings 52 allow radial thermal growth between case 30 and the thermal load relief ring 50 while maintaining the axial location of thermal load relief ring 50.

The net result is a snap fit which allows thermal growth between the two cases having different coefficients of thermal expansion without over stressing any of the component parts. As mentioned in the above, the thermal load relief ring of this invention allows repair/redesign of existing snap configurations of gas turbine engines when over-stressing causes cracks or yielding in either of the cases.

Figure 9:
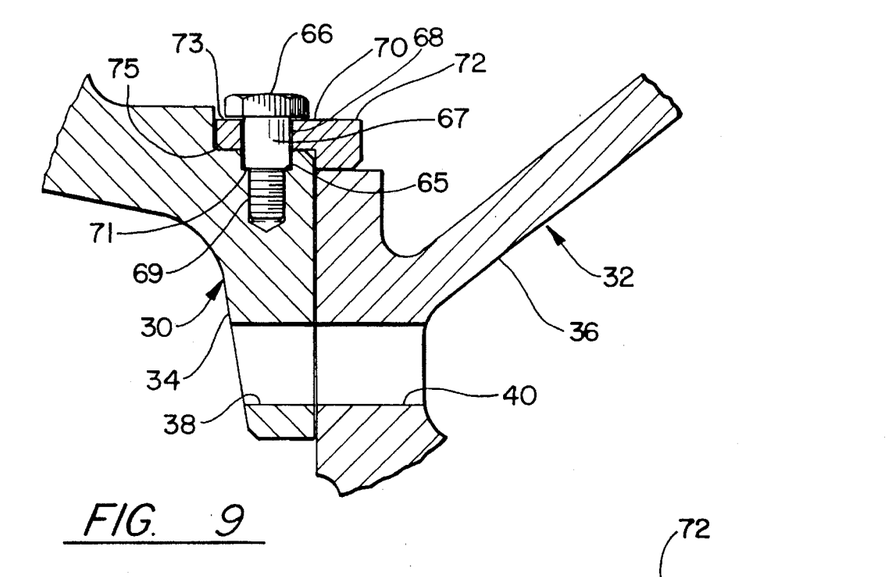
FIG. 9 is a partial view in section identical to FIG. 3 except for the attaching mechanism exemplifying another embodiment of this invention.
Figure 10:
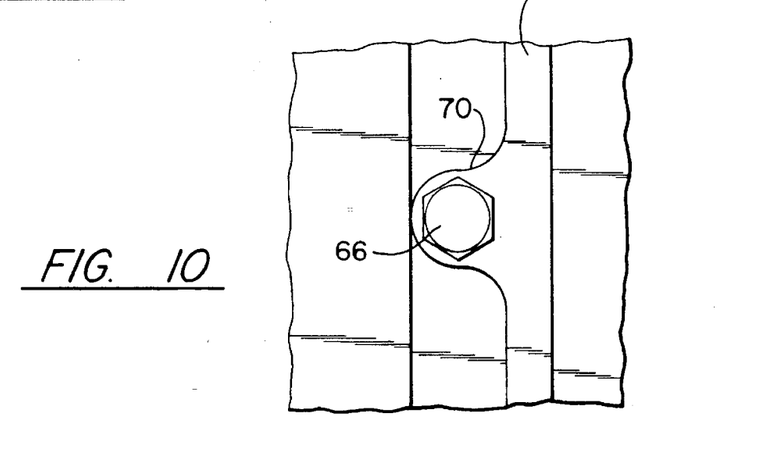
FIG. 10 is a partial top plan view of the embodiment depicted in FIG. 9.
Figure 11:
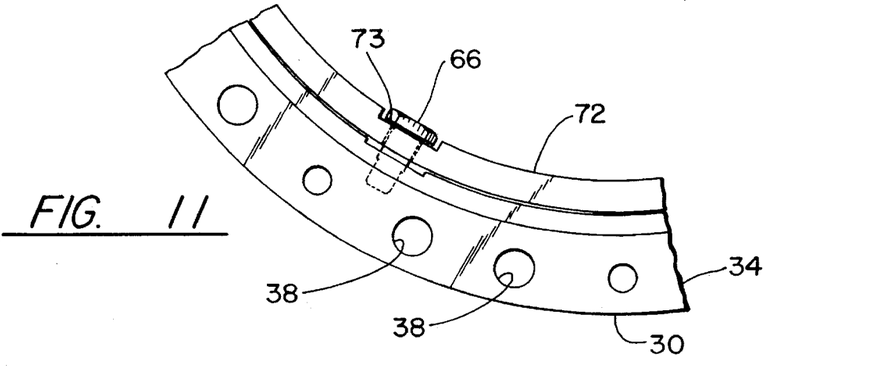
FIG. 11 is a partial front view of the configuration of FIG. 9 with one of the cases being removed for clarity.

FIGS. 9–11 exemplify another version of this invention where the thermal load relief ring is bolted to the case 30 rather than pinned. In this embodiment the machine shouldered bolts 66 fit into drilled hole 68 formed in tang 70 of the thermal load relief ring 72 and partially in case 30. Then the bolts 66 are threaded into case 30. Shoulder 65 formed between the shank 67 and threads 69 of each of the bolts 66 are seated on the shoulder 71 formed in case 30. The interference fit between machine shoulder 65 and case 30 serve to define a gap 73 between the head of bolt 66 and case 30 to allow for thermal expansion. The mating surfaces between shank 67 of bolt 66 and the drilled hole in tang 70 serve to control the concentricity similarly to the pin 60 depicted in FIG. 3. The bottom edge 75 of tang 70 is chamfered to facilitate leading the tang into place in case 30. (Like elements depicted in all the FIGS. bear identical reference numerals).

Figure 12:
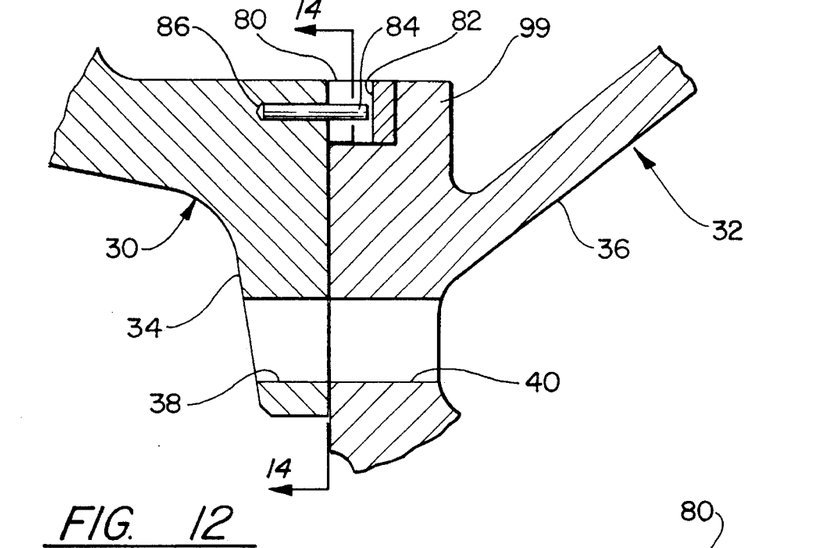
FIG. 12 is a view substantially identical to the configuration on FIG. 3 exemplifying another thermal load relief ring and attachment mechanism.
Figure 13:
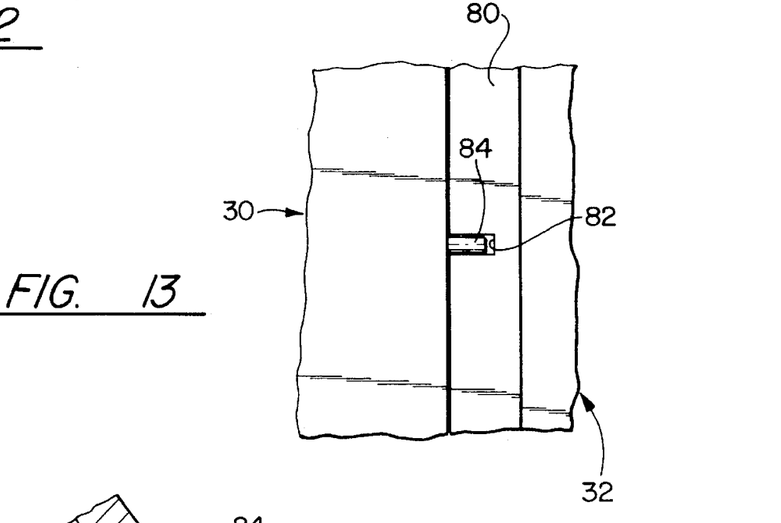
FIG. 13 is a partial top plan view of the embodiment depicted in FIG. 12.
Figure 14:
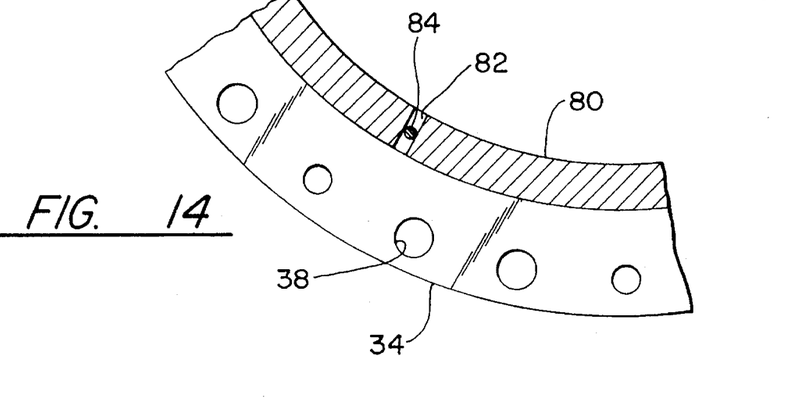
FIG. 14 is a partial front view of the embodiment depicted in FIG. 12.

FIGS. 12–14 exemplify another embodiment of this invention where the thermal relief ring 80 fits into an annular groove 99 formed on the mating face of case 32 and is retained therein. Thermal relief ring 80 carries a plurality of radially slots 82 circumferentially spaced about thermal relief ring 80. The dowel pin 84 fits into a drilled hole 86 formed on the front face of the case 30 and the extends into slot 82 a substantial axial distance. The width of slot 82 is substantially equal to the diameter of dowel pin 84.

The means for maintaining concentricity with connection to the embodiment of FIGS. 12–14 are similar to the means for maintaining concentricity in the embodiment depicted in FIGS. 2–11 albeit by a different method. In this instance the snap fit between cases 30 and 32 remain snug due to their similar coefficients of thermal expansion. The relative position between cases 30 and 32 as a result of thermal load relief ring 80 is unchanged (except for machining tolerance stackup in the original assembly) because the radial movement of the thermal load relief ring 80 in the Y-direction which is the vertical axis is reacted by the dowel pin 84 and radial movement in the X-direction which is in the horizontal-axis is reacted by the dowel pin 84 in the Y-direction. The dowel pin 80 allow radial thermal growth between case 30 and thermal load relief ring 80 while maintaining the axial location of the thermal load relief ring 80. Obviously, three or more dowel pins 84 located at various location around the thermal load relief ring 80 are required to react the external loads properly.

As mentioned above, the thermal load relief ring allows repair/redesign of existing snap configurations of existing engines when over-stressing causes cracks or yielding on the cases. Also, on current or future designs where the stresses in the area where the cases are snap fitted are the basis for the material selection, a significant weight reduction is realized when a thermal load relief ring as described herein is used. This is because one of the cases can be fabricated from a less dense, lower yielding material usually having a large coefficient of thermal expansion. For example, if the stress limiting are is the snap fit region, then a typical weight savings by using a thermal load relief ring instead of a stronger, more dense case is approximately a 60% when the case is aluminum and a stainless steel is intended for its replacement.

What is afforded by utilizing this invention to maintain concentricity of the cases is the ability to retain a snap fit between two mating parts without imposing unacceptable stresses on each other in situations where there is temperature changes coupled with dissimilar coefficients of thermal expansion. With the thermal load relief ring of this invention the only stress in the snap fit area results from external forces and the contact pressure between the thermal load relief ring and the mating case. The immediate benefits of incorporating the thermal load relief ring of this invention into the snap fit areas are repair of existing or non-conforming parts, the redesign of highly-stressed problem areas and significant weight reductions in new designs.

Although this invention has been shown and described with respect to detailed embodiments thereof, it will be appreciated and understood by those skilled in the art that various changes in form and detail thereof may be made without departing from the spirit and scope of the claimed invention.

I claim:

1. Means for maintaining concentricity of two adjacent cases having end walls and being attached at adjacent mating surfaces defined by said end wall of each of said cases comprising a thermal load relief ring fitted into a recess formed in one of said end walls of said two adjacent cases and axially bearing against the other of said end walls of said two adjacent cases, said thermal load relief ring being retained in an axial direction by a wall defining said recess, at least two dowel pins circumferentially spaced about said thermal load relief ring, wherein each of said dowel pins having one end extending into the recess to be fitted into a slot formed on an internal diameter of said thermal load relief ring and having another end fitted into a drilled hole formed in said other end wall of said two adjacent cases, said one of said two adjacent cases having a predetermined coefficient of thermal expansion, the material of said thermal load relief ring having a predetermined coefficient of thermal expansion, and the material of said thermal load relief ring having the same or higher coefficient of thermal expansion as the coefficient of thermal expansion of said one of said two adjacent cases.

2. Means for maintaining concentricity of two adjacent cases as claimed in claim 1 wherein said thermal load relief ring having a vertical axis defining a Y-axis and a horizontal axis defining an X-axis, said dowel pins are spaced relative to each other such that a radial movement of said thermal load relief ring in the Y-axis of said thermal load relief ring is reacted by one of said two dowel pins in the X-axis of the thermal load relief ring and a radial movement of the thermal load relief ring in the X-axis of said thermal load relief ring is reacted by the other of said two dowel pins in the Y-axis of said thermal load relief ring.

3. Means for maintaining concentricity of two adjacent cases as claimed in claim 2 wherein an axial dimension of said dowel pin is spaced from an end wall defining said slot and a dimension of said slot is such that the width of said slot is substantially same as the diameter of said dowel pin.

* * * * *

UNITED STATES PATENT AND TRADEMARK OFFICE
CERTIFICATE OF CORRECTION

PATENT NO.   : 5,551,790

DATED        : September 3, 1996

INVENTOR(S)  : Patrick B. Melton

It is certified that error appears in the above-identified patent and that said Letters Patent is hereby corrected as shown below:

Col., 1, after the title insert

-- This invention was made under a U. S. Government contract and the Government has rights herein. --

Signed and Sealed this

Twenty-fourth Day of December, 1996

Attest:

BRUCE LEHMAN

*Attesting Officer*     *Commissioner of Patents and Trademarks*